United States Patent [19]

Foust

[11] Patent Number: 5,638,806
[45] Date of Patent: Jun. 17, 1997

[54] SAFETY SYSTEM FOR COOKING UTENSILS

[76] Inventor: Carl Boyd Foust, 818 Hampton Way, Merritt Island, Fla. 32953

[21] Appl. No.: 581,878

[22] Filed: Jan. 2, 1996

[51] Int. Cl.[6] .................................................. F24C 15/30
[52] U.S. Cl. ...................... 126/24; 126/373; 126/214 A; 220/324; 220/606
[58] Field of Search .................... 126/24, 42, 215, 126/214 R, 214 A, 373, 383–389, 390, 376, 39 M; 220/324, 327, 328, 606; 248/246.03; 219/432

[56] References Cited

U.S. PATENT DOCUMENTS

| | | | |
|---|---|---|---|
| 1,270,236 | 6/1918 | Eckfeldt | 220/327 |
| 1,973,442 | 9/1934 | Nelson | 220/327 |
| 2,997,199 | 8/1961 | Reachi | 220/23.86 |
| 3,127,051 | 3/1964 | Cox | 220/324 |
| 3,372,688 | 3/1968 | Moore | 126/24 |
| 3,433,269 | 3/1969 | Sackett, Jr. | 220/324 |
| 3,515,116 | 6/1970 | Finnstrand | 126/24 |
| 3,583,384 | 6/1971 | Ranisate | 126/24 |
| 3,960,134 | 6/1976 | Scott | 126/24 |
| 4,089,321 | 5/1978 | Ondrasik, II | 126/215 |
| 4,108,140 | 8/1978 | Wolze | 126/24 |
| 4,261,327 | 4/1981 | Kamin | 126/215 |
| 4,313,050 | 1/1982 | Abenaim | 219/432 |
| 4,346,836 | 8/1982 | Nagel | 126/389 |
| 4,448,186 | 5/1984 | Smith | 126/44 |

*Primary Examiner*—James C. Yeung
*Attorney, Agent, or Firm*—Maguire, Voorhis & Wells, P.A.; Robert L. Wolter

[57] ABSTRACT

The invention in the present application is for a cookware safety system that includes a safety ring that depends from the bottom of a conventional cooking utensil. The safety ring includes a plurality of chair members that are annularly spaced apart to form a ring that depends from the bottom of the cooking utensil. In one embodiment, the chair members are mounted directly to the bottom of the cooking utensil. The chair members are annularly spaced, using as a point of origin, a centerline of a handle to a cooking utensil. The spacing is such that the chair members will fit a three, four, six or eight-pronged gas stove top burner. The cookware safety system also includes a lid retainer that includes tabs mounted to the side of the sidewall of the cooking utensil and pins that are either mounted directly to the lid of the cooking utensil or a lid retainer. A trivet is also provided and includes at least one annularly extending channel that is adapted to receive the safety ring of the cooking utensil. The trivet may also include other channels and depressions to support the lid retainer.

30 Claims, 5 Drawing Sheets

SAFETY SYSTEM FOR COOKING UTENSILS

FIELD OF THE INVENTION

This invention relates generally to cookware used on stoves. More specifically, this invention pertains to those devices, or adaptations of cookware, for stabilizing or securing cookware in place on a gas stove top grate and/or on a counter or table top.

BACKGROUND OF THE INVENTION

A safety hazard with stove top cooking that has continued to exist over the years, is the knocking or toppling hot cookware from the stove. This is especially a problem in moving vessels such as marine vessels, aircraft or recreational vehicles that utilize gas stoves. The potential hazards for these accidents is compounded when children are present that may gain access to a galley area. While other inventions have attempted to solve these problems, the devices have often been unnecessarily complicated and often require adaptations to a stove top.

In U.S. Pat. No. 3,960,134, Scott discloses a utensil holder consisting of a sheet metal hollow cylinder that is expandable and placed on a stove grate for receiving a cooking utensil the holder is notched for the handle of the cooking utensil. Wolze, in U.S. Pat. No. 4,108,140 discloses a flexible sheet member designed to be detachably secured to a burner. Rainsake, U.S. Pat. No. 3,583,384, illustrates an open topped receptacle with grid engaging members for holding cookware. R. J. Moore, U.S. Pat. No. 3,372,688, teaches a combination of cookware having a flange for locking the cookware on a specially adapted grate. Smith, U.S. Pat. No. 4,448,186 discloses a cooking utensil with a first collar depending from the bottom of the cookware and a second collar detachably secured to the first collar for engagement with a stove top. The second collar has spaces available for engaging the stove grate.

Accordingly, an objective of this invention is to provide a safety system for cookware that prevents lateral movement of the cookware and may be mounted directly to the bottom of the cookware or a receptacle for receiving the cookware, or integral therewith, and fits conventional gas stove grates. Another objective of this invention device is to provide a safety ring that provides sufficient venting for oxygen for a flame to burn, while the cooking utensil remains centered over the flame. This may shorten cooking time and save fuel.

Still another object of this system is to provide cooking utensils with a means for retaining a lid on cooking utensils. Yet another objective of this safety system is to provide a trivet that has annularly and radially extending channels for holding the cooking utensil and lid retention means.

SUMMARY OF THE INVENTION

These and other objectives are achieved by mounting a plurality of chair members to the bottom of a piece of cookware annularly spaced apart to fit the grates of conventional gas stove burners. The chair member may be a generally U-shaped member having two vertical members depending from the bottom of the cookware with a horizontal member integral the vertical members and maintained in a fixed space relation to the bottom of the cookware. The chair members are annularly spaced equidistance apart forming a ring depending from the bottom of the cookware. Gaps are created between the respective chair members for receiving the prongs of the stove grate. When the cookware is placed on the stove top, the arms of the grates are aligned with a corresponding gap. The chair members depend below the horizontal plane of the grate securing the cookware on the stove top.

A second embodiment of the safety ring is a receptacle having a cylinder with vertical circumferentially extending sidewalls. The chair members mounted or integral to the cylinder sidewall. The chair members are annularly spaced to form a safety ring with gaps between respective chair members. The receptacle is placed on a stove top grate with gaps aligned on the prongs to secure the receptacle. Cookware is placed within the receptacle which has a notch for receiving the handle for the cookware. A handle may be formed in the cylinder opposite the notch for the cookware handle.

A cooking utensil may also have a plurality of tabs mounted to the rim of the cooking utensil. Each tab has an aperture. A lid for the cookware also has tabs each corresponding to a tab on the cookware. Each lid tab has a pin that depends vertically therefrom and is inserted through a corresponding aperture on a tab.

Alternatively, a lid retainer having a handle means and pins depending from the lid retainer correspond to an aperture on the tabs of the cooking utensil. This lid retainer rests on top of a conventional lid for the cooking utensil and the pins insert through aperture holding the lid on the cooking utensil.

In addition, a trivet adapted with annularly extending channels for receiving the chair members of the safety ring provides a placement for hot cookware removed from a stove. The trivet has a non-skid pad, or other securing means, secured to the bottom of the trivet to prevent movement of the trivet on a counter top or table. The trivet may also have additional channels so the trivet may support both the cooking utensil and lid retention means.

The foregoing and other objects, features and advantages of the invention will be apparent from the following more particular description of preferred embodiments of the invention, as illustrated in the accompanying drawings.

DETAILED DESCRIPTION OF THE DRAWINGS

Figure 1:
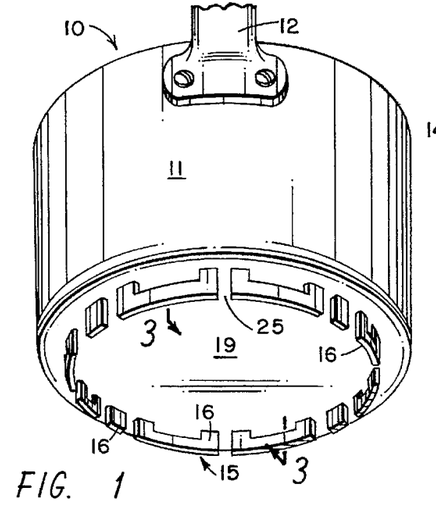
FIG. 1 is a perspective bottom view of a cooking utensil with safety ring.

The invention is for a safety system for cooking utensils. A typical cooking utensil 10 is illustrated in FIG. 1, and generally includes a cylindrical sidewall 11 that is integral a bottom 19. A handle 12 is mounted to the cylindrical wall 11 for a user to manipulate the cooking utensil 10. When a user places the cooking utensil on a stove burner (not shown) the bottom 19 rests flush atop a stove top grate 14. Depending on the type of cooking utensil, a lid 28 (FIG. 18) covers the top opening of the cooking utensil.

In recreational vehicles, aircraft or marine vessels, the cooking utensils have a tendency to slide as the vehicles moves. This movement may cause the cookware to fall of the stove or the contents of the cookware may spill out of the cookware. Additionally, the lid may topple from the cooking utensil. The safety system disclosed herein has been designed to preclude lateral movement of the cooking utensil on the stove top, and prevent the lid from inadvertently falling off the cooking utensil. In addition, this invention provides a trivet means for securing or stabilizing the cooking utensil on a counter or table top. One skilled in the art will realize this safety system also has advantages in the home.

As one may appreciate from reviewing this specification, this safety system for a cooking utensil includes a safety ring 15 depending vertically below the bottom 19 of the cooking utensil 10. FIGS. 1, 7, 12, 16 and 25 illustrate different embodiments of the safety ring 15. The invention may also include a means for retaining the lid on the cooking utensil 10, and the different embodiments of the lid retention means are set forth in FIGS. 18-24. Also, the invention may be equipped with a trivet means 43 for supporting and securing the cooking utensil 10 and a lid retainer 22 on a counter or table top. The different embodiments of the trivet 43 and its function with relation to the cooking utensil and the lid retention means will be described in more detail below with reference to FIGS. 9-11, 26-27.

With reference to FIG. 1, there is illustrated a cooking utensil 10 equipped with a safety ring 15. The safety ring 15 includes a plurality of chair members 16 annularly spaced apart to form the ring 15 depending from the bottom 19 of the cooking utensil 10. As each chair member 16 is separated from a consecutive chair member, a gap 25 is formed therebetween. The chair members in the embodiment shown in FIG. 1 are spaced inward of the sidewall 11.

Figure 2:
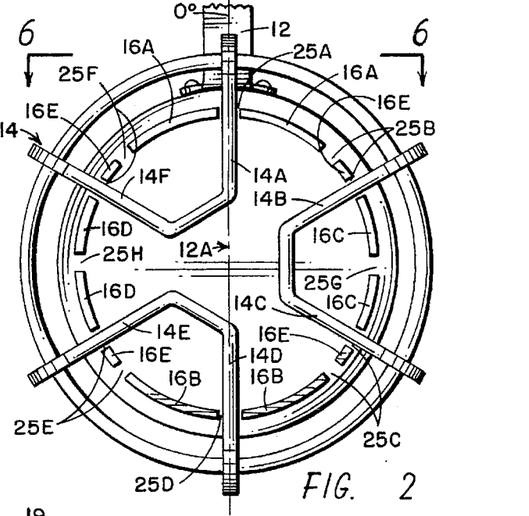
FIG. 2 is a bottom view of a cooking utensil on a gas stove top with a six-prong grate.
Figure 3:
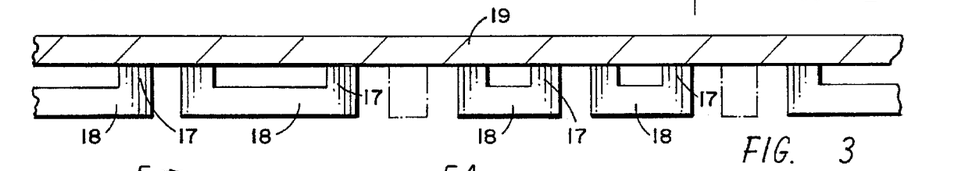
FIG. 3 is a cross-sectional view taken along line 3—3 in FIG. 1.
Figures 4, 5, 5A, 6:
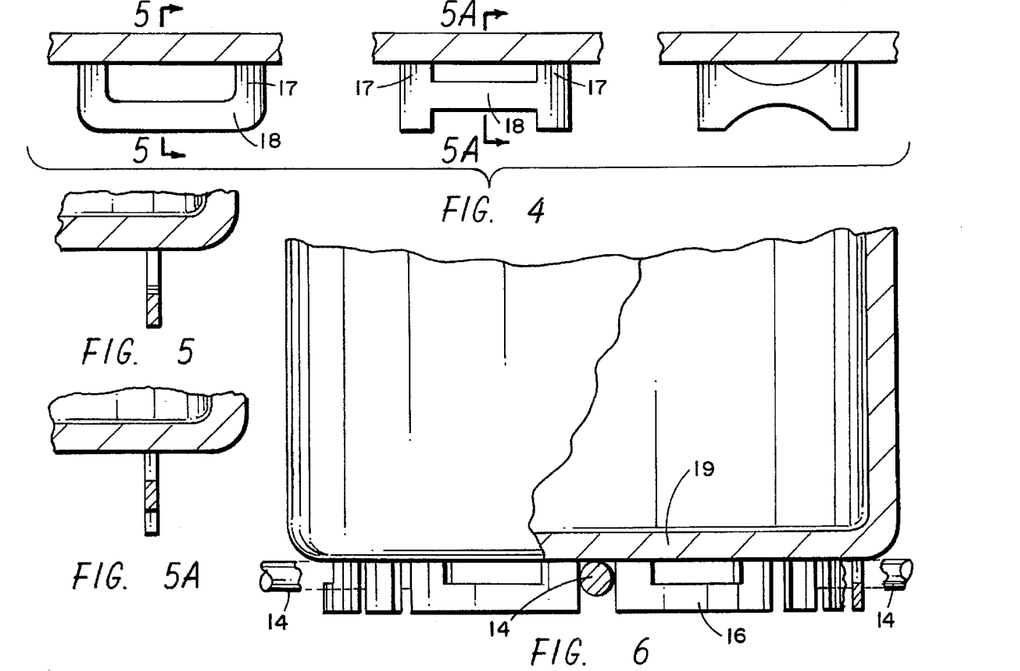
FIG. 4 is a side-elevational view of three embodiments of the chair member.
FIG. 5 is a cross-sectional view taken along line 5—5 in FIG. 4.
FIG. 5A is a cross-sectional view taken along line 5A—5A in FIG. 5.
FIG. 6 is an elevational view of a cooking utensil with a safety ring on a gas stove top grate.

The chair members 16 are aligned on the bottom 19 using the centerline 12A of handle 12 as an origin of reference. The cooking utensil 10 in FIG. 2 is resting on top of stove grate 14 having prongs 14A-F. As shown in FIG. 2, the chair members 16 are attached to the bottom 19 and annularly spaced so that when the handle is aligned on any prong 14A-F of the grate 14, the prongs 14A-F fit within a gap 25 between two respective chair members 16. As shown in FIG. 6, the chair members 16 depend below a horizontal plane defined by the stove grate 14 to secure the cooking utensil 10 on the stove top and prevent lateral movement of the cooking utensil 10.

While the size and shape of the chair members 16 may vary, according to the size of the pan, the spacing between the chair members 16 should remain uniform.

From the centerline 12A, prong 14A and gap 25A rotating clockwise around the safety ring 15, the chair members 16 are spaced to from gaps 25B at 45° and 60°, gap 25G is at 90° from centerline 12A; gaps 25C are at 120° and 135°; gap 25D is aligned 180° from 25A, gaps 25E are at 225° and 240°; gap 25H is aligned at 270° from gap 25A; and gaps 25F are at positions 285° and 300° from gap 25A. A safety ring with this alignment of chair members 16 and gaps 25, may fit any conventional three, four, six or eight prong stove top grate.

As shown in FIG. 2, the cooking utensil and safety ring are placed on a six-prong grate 14. The centerline 12A of the handle 12 has a point of origin at 0°, and prong 14A is aligned on gap 25A; prong 14B is aligned with gap 25B at 60°, prong 14C is aligned with gap 25C at 120°, prong 14D is aligned with gap 25D at 180°, prong 14E is aligned with gap 25E at 240° and prong 14F is aligned with gap 25F at 300°.

In order to accommodate the safety ring 15 with the gaps 25 at these specific locations and adequately secure the cooking utensil 10 on a grate, the ring 15 may include chair members of three different sizes. For instance, the cooking utensil 10 in FIGS. 1 and 2 has an outside diameter of about seven inches (7") and the chair members 16 are mounted thereon to form a safety ring 15 with an outside diameter of 6". Each of the chair members is spaced one quarter inch (¼") apart.

Some of the chair members 16 are a generally U-shaped member and include two vertical legs 17 depending from the bottom 19 of the cooking utensil. A horizontal member 18 extends intermediate the legs 17. FIG. 4 illustrates different forms of chair members 16 each having the vertical legs 17 and intermediate horizontal member 18. Maintaining the horizontal member 18 in spaced relation to the bottom 19 of the cooking utensil and forming the gaps 25 in the safety ring provides sufficient ventilation for a flame to efficiently burn while on the stove. The chair members in the embodiment shown in FIG. 1 and 2 are approximately five eighths of an inch (⅝") in height. Since the chair members 16 are used to form a ring, each of the horizontal member 18 is an accurate member with a radius of approximately three inches (3"). Note, the size of the chair members 16 will vary on the diameter of the safety ring.

Figure 25:
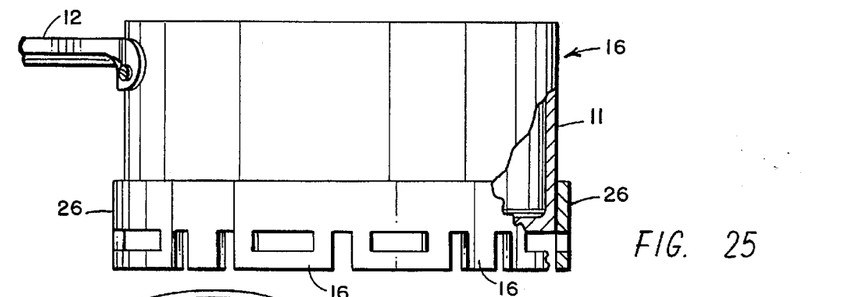
FIG. 25 is a side view of a fourth embodiment of the safety ring.

The different embodiments of the safety ring 15 illustrated in FIGS. 1, 2 and 25 include twelve chair members 16 having three different sizes. A first 16A and second pair 16B of chair members are the largest chair members and are approximately 1⅝" between the vertical legs 17. As shown in FIG. 2, the first 16A and second 16B pair of chair members are mounted on the cooking utensil 10 so the gaps 25A and 25D are aligned on the centerline 12A of the cooking utensil.

A third 16C and fourth pair 16D are mounted intermediate the first 16A and second pair 16B. Gap 25G is intermediate third pair 16C and gap 25H is between the fourth pair 16D of chair members. Each of the gaps 25G and 25H is aligned perpendicular the centerline 12A. The third 16C and fourth pair 16D of chair members is each about member ⅞" wide and member ⅝" in height.

A chair member 16E is mounted intermediate the chair members 16A and 16C to form gaps 25B; and intermediate chair members 16B and 16C to form gaps 25C. A chair member 16E is also mounted intermediate chair member 16B and 16D to form gaps 25E, and between 16D and 16A to form gaps 25F. This third chair member 16E is in a solid form and is about ⅝" tall and ½" wide. As shown in FIG. 2, the chair members 16A–E and C are placed in end to end align to form the safety ring 15 having gaps 25. As noted above, the gaps 25 are annularly spaced from the centerline 12A at the various angles noted above so the safety ring 15 fits conventional 3, 4, 6 or 8 prong gas stove grates, In FIG. 6, the cooking utensil 10 is shown resting atop a stove grate 14. The grate defines a horizontal plane and the chair members 16 depend below that plane to prevent lateral movement of the cooking utensil 10 on a stove.

Figures 7, 8, 9, 10, 11:
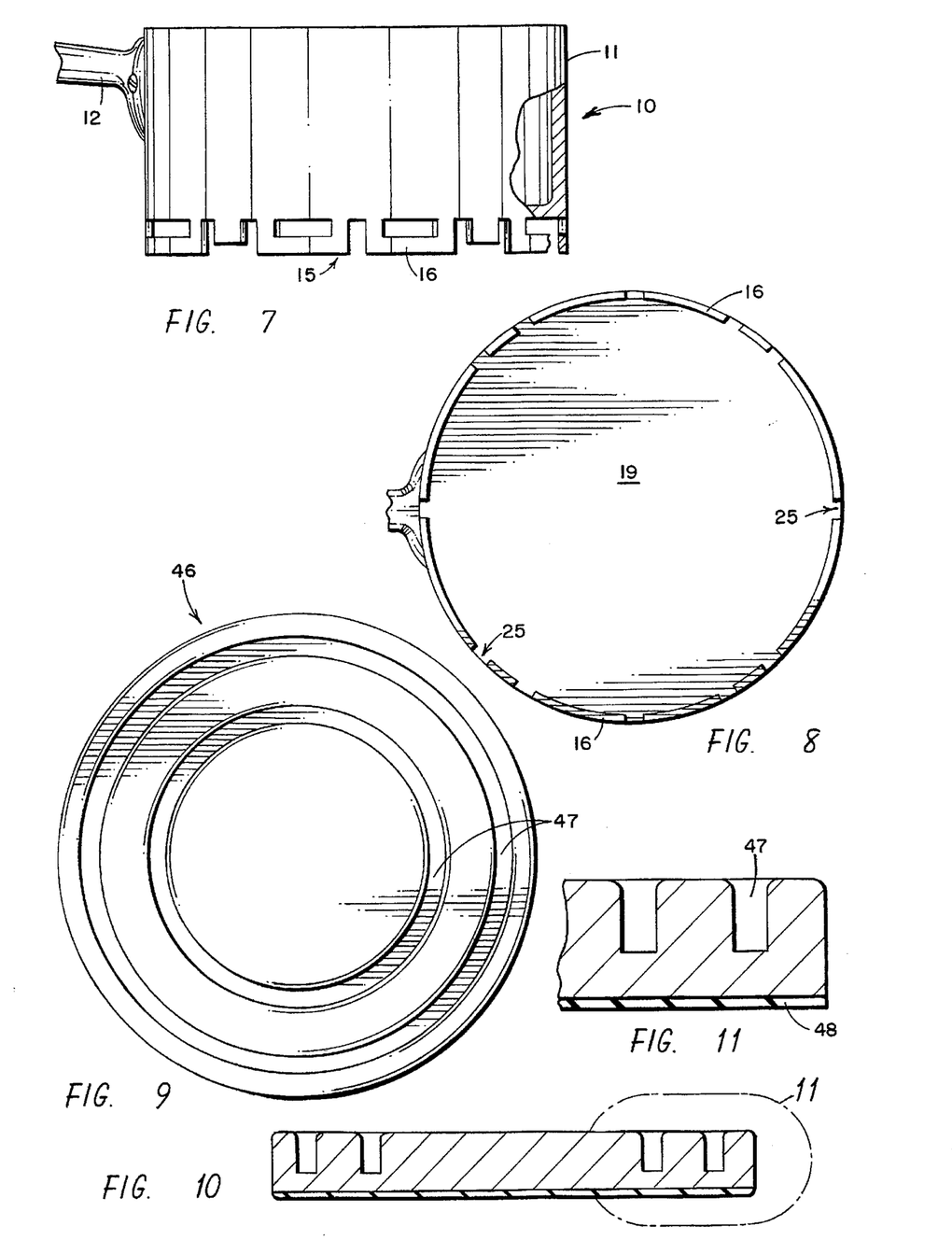
FIG. 7 is a side-elevational view of a second embodiment of the safety ring.
FIG. 8 is a bottom view of the invention shown in FIG. 7
FIG. 9 is a top view of the trivet.
FIG. 10 is a cross-sectional view taken along line 10—10 in FIG. 9.
FIG. 11 is an expanded view of the inset 11 in FIG. 10.

A second embodiment is shown in FIG. 7 and 8 where the chair members are positioned flush with the sidewall 11 of the cooking utensil 10. Alternatively, as shown in FIG. 25, the safety ring 15 may include collar 26 that is mounted to the sidewall 11. The chair members 16 are integral the collar 26 and depend below the bottom 19 of the cooking utensil 10.

Figure 12:
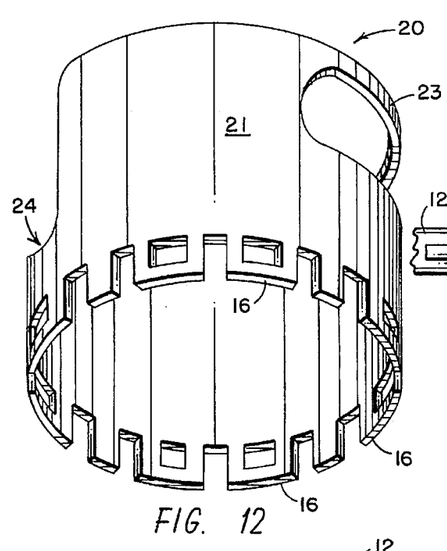
FIG. 12 is a bottom perspective of a third embodiment of the safety ring.
Figure 13:
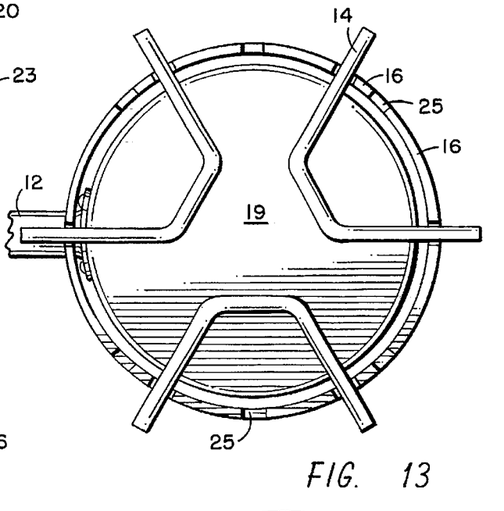
FIG. 13 is a bottom of the third embodiment on a gas stove grate.
Figure 14:
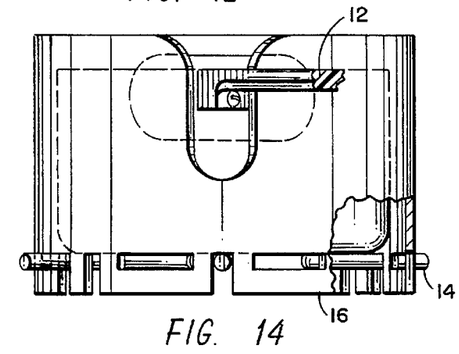
FIG. 14 is an elevational view of the third embodiment with a cooking utensil.
Figure 15:
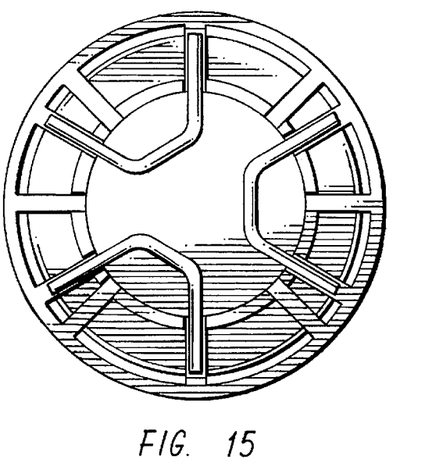
FIG. 15 is a bottom view of FIG. 17 on a gas stove grate.
Figure 16:
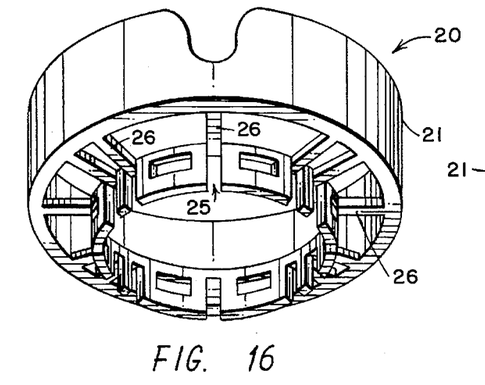
FIG. 16 is a fourth embodiment of the safety ring.
Figure 17:
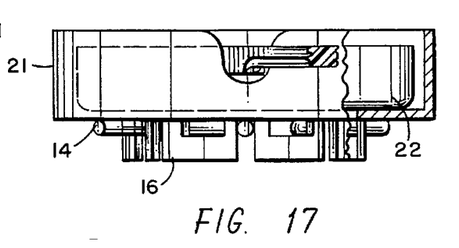
FIG. 17 is an elevational view of the embodiment of FIG. 16 on a gas stove grate.

With respect to FIGS. 12–17, an alternative embodiment of the safety ring 15 is illustrated. In FIG. 12, there is shown a cylinder 20 with cylindrical sidewalls 21. Chair members 16 are integral the sidewalls 21 and spaced apart as described above. In this particular embodiment, the cylinder 20 is placed on the stove top as shown in FIG. 14, and the cooking utensil 10 is placed on the stove within the cylinder 20. A notch 24 is formed in the sidewall 21 through which the handle 12 extends. An opening or slot is formed in the sidewall 21 forming a handle 23 for the cylinder 20.

This cylindrical safety ring 20 may be adapted to receive larger diameter cooking utensils as a frying pan 22, so the diameter of the cylinder 20 may exceed the diameter of stove grate 14. In such a case, the chair members must be spaced inward of the outside diameter of the sidewall 21. With respect to FIG. 16, arms 26 are mounted to the sidewall 21 and extend radially inward in a substantially horizontal plane. The chair members 16 mounted intermediate the arm members 26 distal the sidewalls 21, and depend vertically from the arm members 26.

This invention also includes means for retaining a lid 28 on a cooking utensil 10. With respect to FIG. 18, there is shown a cooking utensil 10 having a plurality of flanges or tabs 29 mounted to the rim of the sidewall 11. The tabs 29 are preferably annularly spaced equidistance apart. Each tab 29 has an aperture 30. The lid 28 is also equipped with tabs 31. Each tab 31 on the lid 28 has pin 32 extending vertically downward from the tab 31. The tabs 31 are mounted to the lid 28 so each pin 32 aligns with a corresponding aperture 30 on tab 29.

Figures 18, 19, 20, 21, 22, 23, 24:
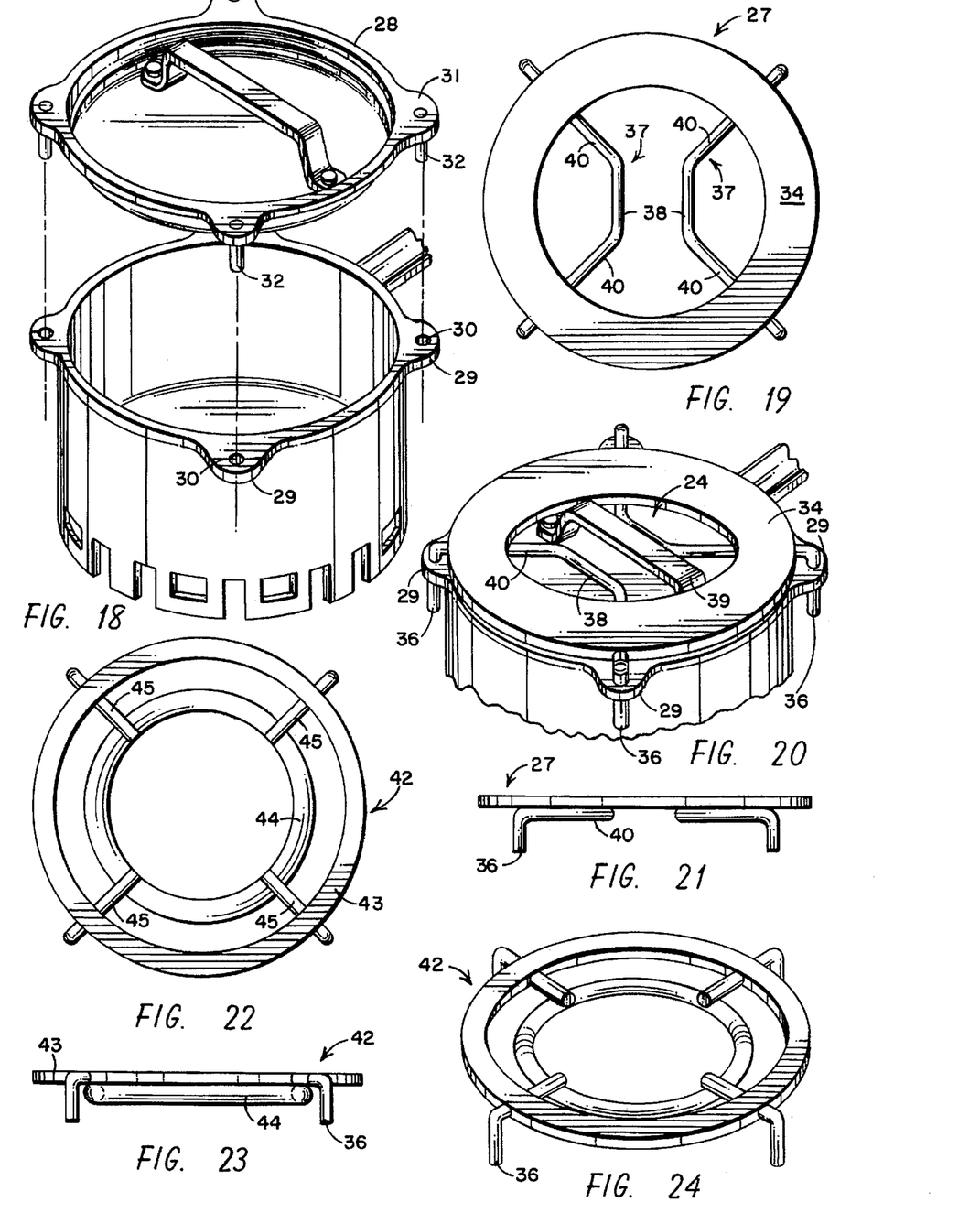
FIG. 18 is a perspective view of a cooking utensil with a safety lid.
FIG. 19 is a top view of a lid retainer.
FIG. 20 is a perspective view of a lid retainer on a cooking utensil.
FIG. 21 is a cross-sectional view taken along lines 21—21 in FIG. 19.
FIG. 22 is a top view of a second embodiment of the lid retainer.
FIG. 23 is a cross sectional view taken along lines 23—23 in FIG. 22.
FIG. 24 is a perspective view of the lid retainer in FIG. 18.

In another embodiment, shown in FIGS. 19–24, a lid retainer 27 having retainer pins 36 is placed over lid 24 and pins 36 are aligned with apertures 30 on the tabs 29. The lid retainer 27, illustrated in FIGS. 19–21, consists of a circular plate 34. Two handle members 37 are mounted to the bottom of the circular plate 34 and has pins 36 aligned with, and inserted into, apertures 30 of tabs 29 on the cooking utensil 10. Each handle member 37 has a bar 38 that is parallel a lid handle 39 as illustrated in FIG. 20. A radial bar 40, integral each end of bar 38, extends radially outward beyond the outside diameter of the circular plate 34 and is mounted to the bottom of plate 34. Pins 36 are integral the end of each extension 40 and depend vertically downward distal the bar 38, and are inserted into apertures 30 on tabs 29. When the lid retainer 33 is placed on top of a cooking utensil 10 with a lid 24, the lid handle 39 is between the handle bar members 38. Thus, while cooking, a user may grasp the lid handle 39 to remove and replace the lid 24 with the lid retainer 27 remaining on the lid 24.

With respect to FIGS. 22–24, a second lid retainer 42 is illustrated. This retainer lid 42 consists of an outer circular plate 43 and an inner circular plate 44. Projections 45 are mounted to the inner circular plate and extend radially outward beyond the outside diameter of the outer circular plate 43. Pins 36, are integral the end of the projections 45, distal the inner circular plate 44, and extend vertically downward and are inserted into apertures 30 of tabs 29. A user holds the lid retainer using the inner circular plate 44 as a handle. When the retainer lid rests on the cooking utensil the lid handle 39 extends upward through the inner circular plate 44 so a user may remove and replace the lid 24 with the lid retainer 42 thereon.

With respect to FIGS. 9–11, 26 and 27, a trivet 46 is illustrated. The trivet shown in FIGS. 9–11 has a plurality of annularly extending channels 47 radially separated for alignment with the safety ring 15 on a cooking utensil 10. A non-skid pad 48 is secured to the bottom of the trivet 46 to prevent movement of the trivet 46 on a counter or table top. When a user removes a cooking utensil 10 from a stove top, he/she places the cooking utensil on the trivet 46 aligning the safety ring 15 with corresponding channels 47 of the trivet.

Figures 26, 27:
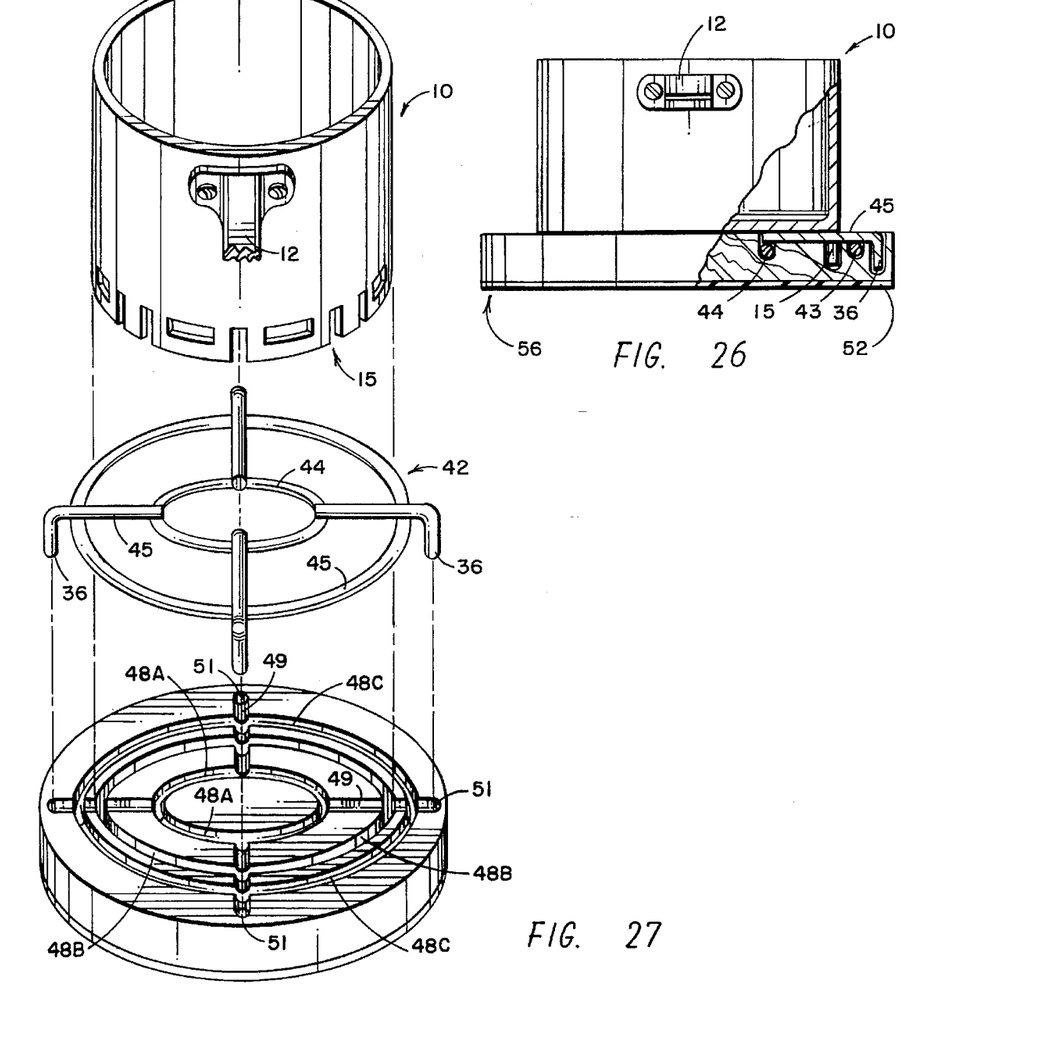
FIG. 26 is a sectional view of the trivet with a lid retainer and a cooking utensil with a safety ring.
FIG. 27 is an expanded view of FIG. 26 of the cooking utensil and lid retainer with a trivet.

The trivet 46 shown in FIGS. 26 and 27 has additional channels 48 for receiving the retainer lid 42 with the cooking utensil 10. As shown in FIG. 27, the trivet has three annularly extending channels 48A–C. The trivet also has radial channels 49. The innermost channel 48A and outermost channel 48C and the radial channels 49 are formed in the trivet 46 for receiving the retainer lid 42. The radial channels 49 are integral the innermost channels 48A and intersect channels 48B and 48C. Each radial channels 49 are spaced on the trivet 46 to correspond to a projection 45 on the retainer lid 42. A depression 51 is formed at the end of each radial channel 49 for receiving the pin 36 on the projection 45. As shown in FIG. 27, when the lid retainer 42 is placed on the trivet 46 circular plate 44 is aligned with the innermost annular channel 48A and outer plate 43 is aligned with the outermost channel 48C. Projections 45 align with radial channels 49 and pins 36 and inserted in holes 51. The projections should be spaced on the lid retainer 42 so they are aligned with gaps 25 of the safety ring 15. Channel 48B, the middle channel, corresponds to the safety ring 15. Thus a user, as shown in FIGS. 26 and 27, after placing the lid retainer 42 on the trivet 46, may place a cooking utensil 10 having a safety ring 15 over the lid retainer 42 aligning gaps 25 with the projections 45, and the safety ring 15 in channel 48B. The non-skid pad 48 prevents the lateral movement of the trivet 47 on a counter and the cooking utensil is held on the trivet in channel 48B. The cooking utensil is further secured by the lid retainer 42, having projections extending through gaps 25 and pins 36 are inserted in depressions 51.

While the invention has been particularly shown and described with reference to preferred embodiments thereof, it will be understood by those skilled in the art that the foregoing and other changes in form and details may be made therein without departing from the spirit and scope of the invention.

Having thus described my invention, what I claim as new and desire to secure by Letters Patent is:

1. A safety system for cookware, comprising:

(a) a cooking utensil having a cylindrical sidewall, a bottom integral the sidewall forming a top opening, a handle mounted to the sidewall, and a lid with a lid handle;

(b) a safety ring depending from the bottom of the cooking utensil, said safety ring having a plurality of chair members annularly spaced apart forming a gap between consecutive chair members;

(c) means for retaining the lid on said cooking utensil; and (d) a trivet having at least one annularly extending channel for receiving said safety ring depending from the cooking utensil when said cooking utensil is placed on the trivet.

2. A safety system for cookware as defined in claim 1 wherein said handle of the cooking utensil has a centerline and said plurality of chair members include a first pair chair members mounted to the bottom of the cooking utensil spaced apart forming a gap therebetween centered on the centerline of the handle, and a second pair of chair members mounted to the bottom the cooking utensil opposite said first pair and having a gap therebetween aligned with the gap between the first pair of chair members and centered on the handle centerline, and a third pair of chair members mounted to the bottom of the cooking utensil intermediate the first and second pair in end-to-end alignment therewith with said third pair of chair members spaced apart forming a gap therebetween in substantially perpendicular alignment with the centerline, and a fourth pair of chair members mounted to the bottom of the cooking utensil intermediate said first and second pair in end-to-end alignment therewith opposite said their pair said fourth pair of chair members spaced apart forming a gap therebetween with said gap aligned with the gap between said third pair of chair members and substantially perpendicular the handle centerline.

3. A safety system for cookware as defined in claim 2 wherein said safety ring includes a chair member mounted intermediate said first and third pair of chair members, a chair member mounted intermediate the third and second pair of chair members, a chair member mounted intermediate the second and fourth pair of chair members and a chair member mounted intermediate the fourth and first pair of chair members.

4. A safety system for cookware as defined in claim 2 wherein each said chair member is a member having two substantially parallel legs mounted to the bottom of the cooking utensil depending therefrom and an arcuate horizontal member extending between the vertical legs in spaced relation to the bottom of the cooking utensil.

5. A cookware safety system as defined in claim 1 wherein said safety ring includes a hollow cylinder having an open bottom and top, said cylinder having an inside diameter greater than the outside diameter of the cooking utensil with said cooking utensil placed within said cylinder, and a plurality of chair members integral the cylinder depending below the bottom of the cooking utensil, with said chair member annularly spaced apart forming a plurality annularly spaced apart.

6. A cookware safety system as defined in claim 5 wherein the handle on said cooking utensil has a centerline and said plurality of chair members includes a first pair chair members mounted to the bottom of the cooking utensil spaced apart forming a gap therebetween and centered on the centerline of the handle, and a second pair of chair members mounted to the bottom the cooking utensil opposite said first pair and having a gap therebetween aligned with the gap between the first pair of chair members and centered on the handle centerline, and a third pair of chair members mounted to the bottom of the cooking utensil intermediate the first and second pair of chair members in end-to-end alignment therewith with said third pair of chair members spaced apart forming a gap therebetween in substantially perpendicular alignment with the centerline, and a fourth pair of chair members mounted to the bottom of the cooking utensil intermediate said first and second pair in end-to-end alignment therewith opposite said their pair said fourth pair of chair members spaced apart forming a gap therebetween with said gap aligned with the gap between said third pair of chair members and substantially perpendicular the handle centerline.

7. A cookware safety system as defined in claim 6 wherein said safety ring includes a chair member mounted intermediate said first and third pair of chair members, a chair member mounted intermediate the third and second pair of chair members, a chair member mounted intermediate the second and fourth pair of chair members and a chair member mounted intermediate the fourth and first pair of chair members.

8. A cookware safety system as defined in claim 5 wherein said cylinder has a notch for receiving the handle of the cooking utensil.

9. A cookware safety system as defined in claim 1 wherein said safety ring includes a cylindrical sidewall having an inside diameter greater than the outside diameter of the cooking utensil with said cooking utensil placed therein, and a plurality of arms mounted to the bottom of the cylindrical sidewall extending radially inward with said arms annularly spaced apart, and a chair member mounted to the arms radially inward of the cylindrical sidewall and between consecutive arms depending from the bottom of the cooking utensil.

10. A cookware safety system as defined in claim 9 wherein said cooking utensil has a handle having a centerline and said plurality chair members includes a first pair chair members mounted to the bottom of the cooking utensil spaced apart forming a gap therebetween a centered on the centerline of the handle, and a second pair of chair members mounted to the bottom the cooking utensil opposite said first pair and having a gap therebetween aligned with the gap between the first pair of chair members and centered on the handle centerline, and a third pair of chair members mounted to the bottom of the cooking utensil intermediate the first and second pair in end-to-end alignment therewith with said third pair of chair members spaced apart forming a gap therebetween in substantially perpendicular alignment with the handle centerline, and a fourth pair of chair members mounted to the bottom of the cooking utensil intermediate said first and second pair in end-to-end alignment therewith opposite said their pair said fourth pair of chair members spaced apart forming a gap therebetween with said gap aligned with the gap between said third pair of chair members and substantially perpendicular the centerline.

11. A cookware safety system as defined in claim 10 wherein said safety ring includes a chair member mounted intermediate said first and third pair of chair members, a chair member mounted intermediate the third and second pair of chair members, a chair member mounted intermediate the second and fourth pair of chair members and a chair member mounted intermediate the fourth and first pair of chair members.

12. A cookware safety system as defined in claim 1 wherein said safety ring includes a collar mounted to the cylindrical sidewall of the cooking utensils with the chair members mounted to said collar and depending below the bottom of the cooking utensil.

13. A cookware safety system as defined in claim 12 where said cooking utensil has a handle having a centerline and said plurality of chair members includes a first pair chair members mounted to the bottom of the cooking utensil spaced apart forming a gap therebetween a centered on the centerline of the handle, and a second pair of chair members mounted to the bottom the cooking utensil opposite said first pair and having a gap therebetween aligned with the gap between the first pair of chair members and centered on the handle centerline, and a third pair of chair members mounted to the bottom of the cooking utensil intermediate the first and second pair in end-to-end alignment therewith with said third pair of chair members spaced apart forming a gap therebetween in substantially perpendicular alignment with the handle centerline, and a fourth pair of chair members mounted to the bottom of the cooking utensil intermediate said first and second pair in end-to-end alignment therewith opposite said their pair said fourth pair of chair members spaced apart forming a gap therebetween with said gap aligned with the gap between sid third pair of chair members and substantially perpendicular the centerline.

14. A safety system for cookware as defined in claim 13 wherein said safety ring includes a chair member mounted intermediate said first and third pair of chair members, a chair member mounted intermediate the third and second pair of chair members, a chair member mounted intermediate the second and fourth pair of chair members and a chair member mounted intermediate the fourth and first pair of chair members.

15. A safety system for cookware as defined in claim 1 wherein said lid retention means includes a plurality of tabs mounted to the sidewall of the cooking utensil with each said tab having an aperture, and said lid has a plurality of lid tabs, each lid tab corresponding to a tab on the cooking utensil sidewall, and a pin mounted to each lid tab depending therefrom, each said pin corresponding to an aperture in a sidewall tab.

16. A safety system for cookware as defined in claim 1 wherein said cooking utensil has four tabs mounted to the sidewall of the cooking utensil each said tab having an aperture and said lid retention means includes a lid retainer over the lid of the cooking utensil, said lid retainer having a mounting plate, and handle bars on each side of the lid handle, a projection integral each end of each handle bar extending toward a corresponding tab on the sidewall of the cooking utensil and a pin mounted to each projection, distal the handle bar, depending therefrom and aligned with a corresponding aperture on the tab.

17. A cookware safety system as defined in claim 1 wherein said cooking utensil has a plurality of tabs mounted to the sidewall with each said tab having an aperture and said lid retention means include a lid retainer having a handle bar member extending circumferentially about the lid handle and an outer rigid member and a projection mounted to said inner rigid handle member extending radially therefrom toward each tab and holding the handle bar member and outer rigid member in a fixed space relation and a plurality of pin members mounted to said outer rigid member depending therefrom and each said pin member corresponding to an aperture on said tab.

18. A cookware safety system as defined in claim 17 wherein said trivet is adapted to receive said lid retainer and includes a first annularly extending channel having a diameter corresponding to said handle bar member, and a second annularly extending channel spaced radially outward from the first channel and corresponding to the diameter of said the outer rigid member, and a third annularly extending channel spaced between the first and second channels corresponding to the diameter of the safety ring, and a plurality of radial channels integral said first channel extending radially outward therefrom intersecting the second and third channels, said channel corresponding to a projection on the lid retainer, and a depression integral each said radial channel corresponding to a pin member on the lid retainer.

19. A safety ring for securing a cooking utensil on a stove burner grate with prongs said cooking utensil having a cylindrical sidewall, a bottom integral said sidewall and a handle mounted to said sidewall, said safety ring comprising:

a plurality of chair members mounted to the bottom of the cooking utensil depending therefrom with said chair members annularly spaced apart to form a gap between each consecutive chair member and said stove gate prongs extending through a corresponding gap in the safety ring.

20. A safety system for cookware as defined in claim 19 wherein said handle of the cooking utensil has centerline and said plurality of chair members includes a first pair chair members mounted to the bottom of the cooking utensil spaced apart forming a gap therebetween a centered on the centerline of the handle, and a second pair of chair members mounted to the bottom the cooking utensil opposite said first pair and having a gap therebetween aligned with the gap between the first pair of chair members, and a third pair of chair members mounted to the bottom of the cooking utensil intermediate the first and second pair in end-to-end alignment therewith with said third pair of chair members spaced apart forming a gap therebetween in substantially perpendicular alignment with the handle centerline, and a fourth pair of chair members mounted to the bottom of the cooking utensil intermediate said first and second pair in end-to-end alignment therewith opposite said fourth pair of chair members spaced apart forming a gap therebetween with said gap aligned with the gap between said third pair of chair members and substantially perpendicular the handle centerline.

21. A safety ring for securing a cooking utensil on a stove top burner grate having prongs, said cooking utensil having a cylindrical sidewall, a bottom integral the sidewall, and a handle mounted to said sidewall, said safety ring comprising:

(a) a collar mounted to the exterior of said sidewall; and,
(b) a plurality of chair members integral said first collar and depending below the bottom of the cooking utensil, said chair members annularly spaced apart to form a ring having a plurality of annularly spaced gaps through which said prongs extend.

22. A safety ring for securing a cooking utensil on a stove top burner grate having prongs, said cooking utensil having a cylindrical sidewall, a bottom integral the sidewall and a handle mounted to the sidewall, said safety ring comprising:

(a) a vertically extending cylinder having a diameter greater than the diameter of the cooking utensil with said cooking utensil placed within said cylinder and resting on top of a stove grate; and (b) a plurality of chair members mounted on the cylinder depending below the bottom of the cooking utensil, said chair members are annularly spaced apart forming a plurality of annularly spaced gaps between consecutive chair members, with each prong extending through a gap.

23. A safety ring as defined in claim 22 wherein said handle on the cooking utensil has a centerline parallel its longitudinal axis and a first pair of chair members mounted to the cylinder spaced apart forming a gap therebetween centered on the centerline of the handle, and a second pair of chair members mounted to the cylinder opposite the first pair of chair members and spaced apart forming a gap therebetween aligned with the gap between said first pair, and a third pair of chair members mounted to the cylinder intermediate the first and second pair of chair members with said third pair spaced apart to form a gap therebetween centered on a line perpendicular and bisecting said centerline, and a fourth pair of chair members mounted to the cylinder opposite the third pair and spaced apart to form a gap therebetween with said gap aligned with the gap between the third pair of chair members.

24. A safety ring as defined in claim 23 wherein said plurality of chair members includes a chair member mounted intermediate said first and third pair chair members, a chair member mounted between said third and second pair of chair members, a chair member mounted between the second and fourth pair of chair members, and a chair member mounted between the fourth and first pair of chair members.

25. A safety ring as defined in claim 24 wherein said safety ring further includes a plurality of arms mounted to the bottom of the cylinder extending radially inward with said arms annularly spaced apart, and a chair member mounted intermediate consecutive arms in spaced relation to the cylinder and depending vertically from said arms.

26. A lid retention means for a cooking utensil, said cooking utensil having a cylindrical sidewall, a bottom integral the sidewall, a handle mounted to the sidewall, and a lid to cover a top opening of the cooking utensil, said lid retention means, comprising:

(a) a plurality of tabs mounted to the sidewall of the cooking utensil, each tab having an aperture;

(b) a plurality of lid tabs mounted to the lid, each lid tab corresponding to a tab mounted on the sidewall of the cooking utensil; and, (c) a pin mounted to each lid tab and vertically depending therefrom in alignment with an aperture on a corresponding tab on the sidewall of the cooking utensil.

27. A lid retention means for a cooking utensil, said cooking utensil having a cylindrical sidewall, a bottom integral the sidewall, a handle mounted to the sidewall, and a lid with a lid handle, and said lid retention means resting on top of the lid, said lid retention means, comprising:

(a) a plurality tabs mounted to the sidewall each tab having an aperture;

(b) a handle bar member resting on top of the lid;

(c) a plurality of projections mounted to the handle bar member extending radially outward;

(d) a rigid mounting plate resting on top of the lid with an end of each projection mounted thereon distal the handle bar member maintaining said handle bar member and the rigid mounting plate in fixed space relation; and, (e) a plurality of pins mounted to the rigid mounting plate each pin depending vertically from the rigid mounting plate and corresponding to a tab for insertion through an aperture in the tab.

28. A lid retention means as defined in claim 27 wherein said handle bar member includes a circular bar member having a diameter greater than the longitudinal length of the lid handle and said projections mounted thereon extending intermediate the rigid mounting plate and said circular bar member said projections mounted to the rigid mounting plate.

29. A lid retention means as defined in claim 28 further including means for storing said lid retention means wherein said storing means includes a trivet having an outer annularly extending channel corresponding to the rigid mounting plate, and an inner annularly extending channel corresponding to said handle bar member, and a plurality of radial channels integral the inner channel and extending radially outward therefrom intersecting said outer channel, with each radial channel corresponding to a projection on the lid retention means and a depression formed in the end of each radial channel distal the inner channel with each depression corresponding to a pin on the lid retention means.

30. A lid retention means as defined in claim 27 wherein said handle bar member includes two parallel bar members resting on top of the lid and said lid handle between the bar members, and a projection integral each end of the bar members extending radially outward to the rigid member mounting plate and mounted thereon.

\* \* \* \* \*